United States Patent [19]

Massa et al.

[11] 3,932,833

[45] Jan. 13, 1976

[54] INSTRUMENT FOR DIRECT MEASUREMENT OF THE VELOCITY OF SOUND IN A FLUID

[75] Inventors: Frank Massa; Donald P. Massa, both of Cohasset, Mass.

[73] Assignee: Fred M. Dellorfano, Jr. and Donald P. Massa, Trustees of the Stoneleigh Trust u/d/t Dec. 4, 1973, Cohasset, Mass.

[22] Filed: Apr. 22, 1970

[21] Appl. No.: 30,631

Related U.S. Application Data

[63] Continuation-in-part of Ser. No. 790,965, Jan. 14, 1969, Pat. No. 3,561,268, and a continuation-in-part of Ser. No. 798,310, Feb. 11, 1969, Pat. No. 3,611,276.

[52] U.S. Cl. .................... 340/5 S; 73/560; 310/8.1; 310/9.1; 340/3 R
[51] Int. Cl.² .......................................... G01H 5/00
[58] Field of Search .......... 181/.5 AP, 110; 310/8.1, 310/8.6, 9.1; 73/170 A, 560; 340/3 R, 5 S

[56] References Cited
UNITED STATES PATENTS
3,611,276   10/1971   Massa .................................. 340/3 R

*Primary Examiner*—Maynard R. Wilbur
*Assistant Examiner*—G. E. Montone

[57] ABSTRACT

This invention provides an expendable velocimeter probe. High frequency transmitting and receiving transducers are mounted opposite to one another in axial alignment on the probe body and on a frame in front of the body. The mounting includes means for accurately adjusting the distance between the transducers in order to provide low cost, but highly reliable, means for calibrating the velocimeter during large scale manufacture of the instruments.

5 Claims, 1 Drawing Figure

U.S. Patent  Jan. 13, 1976  3,932,833
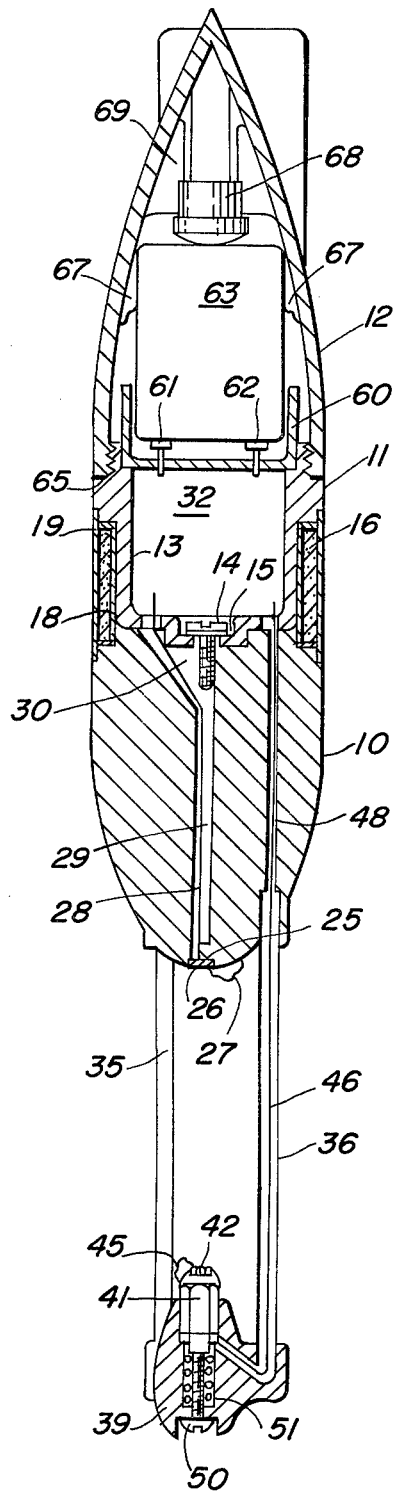
INVENTORS.
FRANK MASSA
DONALD P. MASSA

INSTRUMENT FOR DIRECT MEASUREMENT OF THE VELOCITY OF SOUND IN A FLUID

Reference is made to co-pending applications entitled "EXPENDABLE BATHYTHERMOGRAPH", Ser. No. 790,965, filed Jan. 14, 1969, now U.S. Pat. No. 3,561,268; and "INSTRUMENT FOR DIRECT MEASUREMENT OF THE VELOCITY OF SOUND IN A FLUID", Ser. No. 798,310, filed Feb. 11, 1969, now U.S. Pat. No. 3,611,276 by Frank Massa and assigned to the assignee of this invention. The present application is a continuation-in-part of these co-pending applications.

This invention relates to instruments for measuring the velocity of sound in water and more particularly to expendable free-falling probes for sending telemetering signals giving the velocity of ambient sound in the water surrounding the probe.

A velocimeter is an instrument for instantaneously converting the velocity of sound in a liquid into an electrical signal which may be read out in terms of such velocity. The signal may have a frequency which is directly proportional to the instantaneous value of the ambient velocity of sound in the region of the instrument. In the above-identified co-pending applications, the frequency of the signal is established by a "sing around" repetition technique. More particularly, a high frequency pulse of an acoustic tone signal is transmitted from a first transducer to a second transducer via a path reflected from an acoustic target. At the instant when the reflected signal is received, the transmitting transducer again transmits another pulse of acoustic tone signal.

The repetition rate of the successive pulses of tone is determined by the speed of sound in the water and the length of the path between the transducers and the reflecting target. Thus, there is a problem of establishing a path which is free of the kind of interference that might alter the triggering of the next pulse. For example, a close proximity between a transmitting transducer and a receiving transducer might introduce a cross talk of energy which does not follow the prescribed reflection path between the two transducers, but which does follow a direct path from the transmitting to the receiving transducers. Also, there must be an extremely precise and stable mechanical structure which establishes the length of the path. If the acoustic target is allowed to shift or rotate, the path length or other characteristics might change to produce false readings.

To solve these and other problems, one of the co-pending applications uses a transmitting transducer and a receiving transducer spaced along the outside hull of a streamlined body. This way, there is no short path for cross talk between the transmitting and receiving transducers. However, this configuration of transducers spaced along the body is not too well suited to low cost mass production.

In order to provide an expendable instrument, a preferred probe has a size which is between 1 and 3 inches in diameter. If the probe is made smaller, some subminiature parts are required, and that increases the costs so much that expendability is lost. If the probe is made larger, the cost of material (especially the nose weight) increases too much. Thus, the overall probe size becomes a very important factor to consider. This, in turn, tends to limit the spacing between the transducers to certain maximum and minimum distances. These distances must be related to the frequency of the sonic energy radiated. Therefore, the geometry of the probe becomes an important and critical consideration.

Accordingly, an object of this invention is to overcome some of the limitations in the structural designs which have tended to limit previous velocimeters. Stated another way, an object is to present a probe with a configuration which lends itself to low cost mass production techniques. Therefore, it is an object of this invention to provide improved means for and methods of measuring the velocity of sound in deep water. In particular, an object is to provide means for directly measuring the speed of sound in water or other fluids.

A further object of this invention is to generate an acoustic signal which is transmitted outwardly in all directions from a velocimeter. Here, an object is to generate a signal having a frequency which is an instantaneous function of the velocity of sound in the water surrounding the velocimeter.

A still further object of this invention is to provide a low cost, expendable instrument for directly measuring the velocity of sound in water in the vicinity of the instrument, as it falls freely through the water.

In keeping with an aspect of the invention, these and other objects are accomplished by a probe having a streamlined hull configuration with a weighted nose section that causes it to drop through a body of water at a fixed rate of fall. A transmitting transducer is mounted at the tip of the nose of the hull. A receiving transducer is mounted on a support held by an open rigid frame structure at a point in space which is directly opposite to and axially aligned with the transmitting transducer. The transmitting transducer sends repeated pulsed high frequency ultrasonic signals to the receiving transducer. Each successively transmitted pulse is triggered by the acoustic signals as they arrive at the receiving transducer. Thus, the repetition rate of the pulsed signals is a function of the time required for the sound to travel from the transmitting transducer to the receiving transducer. That time depends upon the speed of sound in the water and the distance between the two transducers.

The tone burst signals have a repetition rate which is directly proportional to the ambient velocity of sound near the probe. These signals are utilized to establish an amplified electrical telemetering signal of the same repetition rate. That signal is applied to a cylindrical omnidirectional transducer mounted flush into the main body of the probe. Thus, the acoustic telemetering signals, which are transmitted from the probe, correspond to the instantaneous velocity of sound. These acoustic telemetered signals may be picked up at a remote point in the water and applied to a direct measurement instrument which records a profile of the manner in which the velocity of sound changes as the probe falls through the water.

These and other objects are accomplished in a preferred embodiment of the invention which may be understood from a study of the following description when taken in conjunction with the accompanying drawing in which the single FIGURE is a longitudinal cross section of a streamlined probe.

Referring more particularly to the FIGURE, the probe comprises a streamlined nose section 10, a central transducer section 11, and a tail section 12. The nose section 10 may be a zinc die casting, for example. The central transducer section 11 is a hollow cup-shaped structure with a ring-shaped flange portion 13 near its open end. The outside diameter of cup 11 is flush with the outer body diameter of the assembled probe structure. The cup-shaped member 11 is fastened to the nose section 10 by means of a screw 14. Preferably, the head of the screw is recessed within an off-set cavity 15 formed in the bottom surface of the cup 11. The horizontal cross-sectional shape of the outside of the off-set portion 15 is preferably rectangular. Thus, it nests into a similarly shaped recess in the base of the nose section 10 to prevent rotation of the cup-shaped member 11, with respect to the nose 10.

A polarized piezoelectric ceramic cylinder 16 is concentrically fitted over the flange 13. A low acoustic impedance isolating gasket 18 is fitted between the ceramic cylinder and the hull parts 10 and 11. Thus, the cylinder is equatorially mounted within a recessed cavity formed by the recessed peripheral portion at the base end of the nose section 10 and the outer wall surface of the cup-shaped member 11. The outer diameter of the ceramic 16 is preferably made smaller than the full body diameter of the assembled probe structure. Therefore, a sound transmitting potting material 19, such as polyurethane, may be applied over the hull after assembly. This potting waterproofs the ceramic and provides a smooth blending of the outer surface of the body surface.

Into a recessed cavity 25 at the tip of the nose section, is assembled a small piezoelectric ceramic plate 26. One electrical connection to the plate is schematically illustrated by the wire 27. A second electrical connection is made by way of another wire 28 which passes through the center hole 29, and the angular communicating slot 30, and into the inside space 32 of the cup member 11. The electrical connection represented by the wire 27 could be either a common connection to the metal nose piece 10; or, the wire 27 could be an insulated wire which also passes through hole 29. After the piezoelectric ceramic plate 26 is assembled into place, a waterproof potting material, such as epoxy or polyurethane, is applied to completely cover and protect it, together with the connecting wires 27, 28. Thus, a proper waterproof insulation is provided for the assembly.

Each piezoelectric ceramic material may be a polarized barium titanate or lead zirconate titanate, made in a known manner.

A superstructure comprising three tubular or rod-like members 35, 36 are symmetrically spaced around and fastened into the streamline nose section 10. These members form a rigid frame structure with an opposite end of the tubular frame rigidly secured to a streamlined base member 39. A hexagonal rod 41 is fitted into the open end portion of the base member 39 to face the streamline nose section 10. The hexagonal shape is used for the member 41 because it fits into a mating hexagonal opening in the base member 39 to prevent any rotation of the structure 41 after here is a final adjustment of its position. The tip of the rod 41 contains a polarized piezoelectric ceramic plate 42, which is countersunk into the face thereof, in a manner which is similar to the countersunk ceramic plate 26.

One of the wires schematically shown at 45 is electrically connected to the outer electrode face of the ceramic 42 and a second wire 46 is similarly connected to the recessed electrode surface. The wire 45 could be connected to the metal frame as a common ground, if desired. Or, it could be a separately insulated wire connected from the ceramic plate 42 to the inside space 32 of the probe. The wiring to the ceramic plate 42 is preferably arranged to pass through the tube 36 and the hole 48 through the nose section 10 and into the compartment 32.

A set screw 50 is threaded into the base of the member 41. A helical spring 51 is provided to prevent any backlash against the screw threads. Thus, the position of the screw 50 holds the surface of the ceramic transducer 42 at a precise and exact position in space.

In order to minimize any change in distance between the ceramic plates 26 and 42, responsive to changes in temperature, the frame members 35, 36 are made of a material having a coefficient of thermal expansion which is lower than the corresponding coefficient of the nose section 10 material. For example, the nose section 10 may be made from zinc, which has a relatively high coefficient of thermal expansion. The frame members 13 may be made from steel, which has a coefficient that is much lower than the coefficient of zinc.

The compartment 32 contains the electronic components (not shown) and any other assembly which may be necessary for the operation of the velocimeter. After this electronic assembly is arranged within the compartment 32, a cup-shaped lid 60 is used to seal the open end of the cup member 11. The lid 60 may be made from molded Bakelite or the like. The open cup or base section of the member 60 contains the electrical terminals with spring contacts 61, 62 which make contact with the mating terminals on a battery 63.

The streamlined tail piece shell 12 may be molded from Bakelite, cast from zinc, or any other suitable material. At its open end, the tail piece contains threads which mate with corresponding threads, provided at the outer edge of the member 11. A waterproof gasket 65 is provided between the end face of parts 11 and 12. Thus, a waterproof seal is realized when the tail piece is screwed into position to the part 11. The inside surface of the tail piece 12 contains several fins 67 which locate and center the battery 63. A soft rubber button 68 is held in position by inside structural fins 69. The button 68 applies axial pressure to securely hold the battery 63 when the tail piece 12 is secured in place.

A practical requirement to be met for the achievement of a low cost expendable probe design is that it should be kept as small as possible. We have found that the optimum diameter for the probe structure is preferably in the range between 1 and 3 inches. If the structure has a diameter which is less than 1 inch, the cost increases due to the necessity of using subminiature electroninc components. Another disadvantage of small probes, having less than 1 inch diameter, is that the transducer element 16 has a resonant frequency which is greater than about 60 kHz. As a result, there would be an excessive attenuation of the sound transmitted through the water. This attenuation limits the useful range of the velocimeter.

If the probe diameter is greater than 3 inches, the weight and cost of the probe increases rapidly. Also, the resonant frequency of the transducer cylinder element 16 is less than 15 kHz. There is an additional disadvantage in this large size because the distance between the nose mounted transducer element 26 and the transducer element 42 must be greater than about 4 inches to establish the resulting lower repetition rate. Thus, the probe becomes too large, too fragile and too expensive when the diameter exceeds 3 inches.

The optimum range of choices for the preferred frequency of operation of the probe lies between 15 kHz and 60 kHz. A choice of the 30 kHz region has proved to be very satisfactory. Such a choice offers an additional advantage since it permits the transducer elements 26 and 42 to be spaced apart by a distance which may be adjusted to 1/20 meter or to 1/20 yard. Then, the transmitted frequency will be exactly 20 times the velocity of sound in terms of m/sec or yds/sec. Other suitable adjustments might be distances such as 0.2 feet. These parameters are convenient for the direct interpretation of the velocity from a direct frequency reading. For example, it may only be necessary to divide the frequency by two and move the decimal. This arrangement coincides with the velocity of sound in the region of 1500 m/sec, which is the approximate velocity of sound in the ocean.

In order to obtain a sufficiently fast rise time for the transducer elements 26 and 42, it is necessary for the resonant frequency of the elements to be much higher than the repetition rate frequency of the system. For the frequency range of operation considered optimum, the resonant frequency of the transducer elements 26 and 42 should be greater than 100 kHz and preferably at least an order of magnitude greater than the repetition rate frequency.

While a specific embodiment of the present invention has been shown and described, it should be understood that various modifications and alternative constructions may be made without departing from the true spirit and scope of the invention. Therefore, the appended claims are intended to cover all such equivalent alternative constructions that fall within their true spirit and scope.

We claim:

1. A velocimeter for directly measuring the velocity of sound in a body of water, said velocimeter comprising a structure having a streamlined shape with a weighted streamlined nose section having a circular base, a transducer means comprising a piezoelectric ceramic cylinder coaxially mounted on said circular base, low acoustic impedance insulation means interposed between the end surface of said ceramic cylinder and said base of said nose section, a cup-shaped member with an extended flange section at its open end, said cup member having a body diameter smaller than the inside diameter of said ceramic cylinder and an outer flange diameter substantially equal to the main body diameter of said nose section, means for rigidly fastening said cup-shaped member to the base of said nose section whereby said cup-shaped member and flange serve as a nest for locating said ceramic cylinder with its outer surface in alignment with the outer surfaces of said nose section and said extended flange section, a low acoustic impedance insulation material between the end surface of said ceramic cylinder and said mating extended flange section of said cup member, a hollow tapered tail section with means for removably attaching said tail section to said extended flange section of said cup member, means for establishing a waterproof seal between said tail section and said flange section, and a waterproof coating covering the exposed ceramic cylinder and the adjoining regions of said flange section and said nose section which confine the ends of said ceramic cylinder.

2. The invention in claim 1 and electronic components assembled within said cup member.

3. The invention in claim 2 and a battery within said hollow tail section.

4. The invention in claim 3 and means comprising a first electroacoustic transducer mounted at the tip of the streamlined nose section.

5. The invention in claim 4 including a superstructure frame member attached to said nose section and projecting an axial distance away from said nose section, a second electroacoustic transducer mounted on said projecting frame, and means included in said mount for adjusting the distance between said first and said second transducer.

* * * * *